United States Patent

[11] 3,628,586

[72] Inventor Walter W. Curtiss
Brimfield, Ohio
[21] Appl. No. 877,336
[22] Filed Nov. 17, 1969
[45] Patented Dec. 21, 1971
[73] Assignee The Goodyear Tire & Rubber Company
Akron, Ohio

[54] PNEUMATIC TIRE
7 Claims, 6 Drawing Figs.
[52] U.S. Cl. .................................................. 152/356
[51] Int. Cl. .................................................. B60d 9/02
[50] Field of Search .......................................... 152/354, 356, 355, 352

[56] References Cited
UNITED STATES PATENTS

| | | | |
|---|---|---|---|
| 3,536,118 | 10/1970 | Boileau | 152/356 |
| 2,700,998 | 2/1955 | Wallace | 152/356 |
| 3,205,931 | 9/1965 | Keefe, Jr. | 152/354 |
| 3,275,056 | 9/1966 | Menell | 152/356 |
| 3,467,161 | 9/1969 | Menell et al. | 152/354 |

Primary Examiner—Arthur L. La Point
Assistant Examiner—Richard A. Bertsch
Attorneys—F. W. Brunner and Michael L. Gill ABSTRACT: A high-speed pneumatic tire having a stable dynamic tread profile characterized by a low-cord angle in the crown area, an even lower cord angle in the shoulder regions, and a high-cord angle in the sidewalls.

INVENTOR.
WALTER W. CURTISS
BY Michael L. Gill
ATTORNEY

PNEUMATIC TIRE

This invention relates to pneumatic tires and more particularly to a novel and improved construction having a special cord path for high-speed pneumatic tires.

Several special cord paths have been proposed in the past for various reasons. These special cord paths are different from the conventional cord paths which are formed by cutting a cord fabric reinforcement on a bias, wrapping the fabric in alternate angles on a drum to form a carcass, and shaping the carcass to the toroidal form. In such a conventional cord path tire the cord angle is at a maximum at the bead areas and decreases progressively to a minimum at the crown of the tread. Two examples of special cord paths are illustrated in U.S. Pat. No. 2,700,998, issued to E. H. Wallace. In this patent there is illustrated a geodesic cord path in which the cord angle is low at the beads and increases to a maximum in the crown area. Also illustrated in this patent is a "dual angle" cord path in which the angle is a maximum at the beads, decreases about 14 to a minimum in the shoulder and increases again to the maximum in the crown area.

As tire speeds increased, the tire aspect ratio was reduced and the tire was reverse molded in an attempt to produce an ideally flat dynamic tread profile at high speed. The aspect ratio is the ratio of the section height of the tire to the section width of the tire. However, the truly flat tread profile has not been attained for several reasons. One problem occurring at high speeds is the throwout or increase in diameter of the shoulder of the tire due to centrifugal force.

It is an object of this invention therefore to provide a tire having good dynamic stability particularly in the tread area. It is a further object of this invention to provide a pneumatic tire which has a substantially flat tread profile throughout a wide range of speeds by providing a novel and improved cord angle relationship.

Other objects and advantages will be apparent from the following detailed description and drawings. In the drawings.

Figures 1, 2:
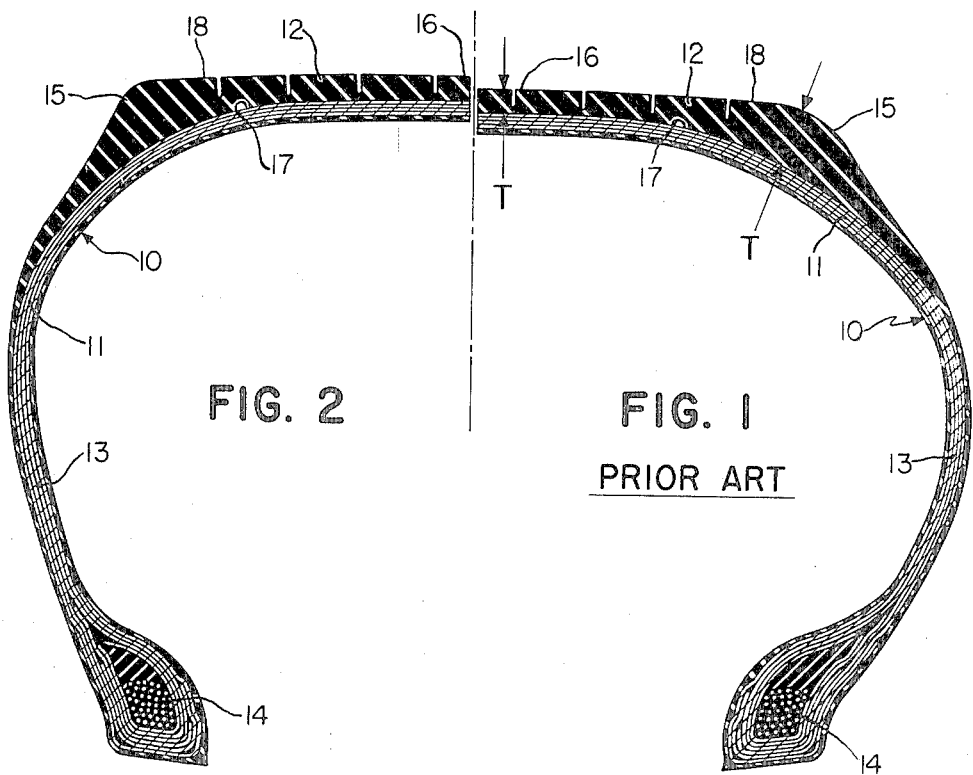
FIG. 1 is a partial cross-sectional view of a prior art high-speed tire inflated and unloaded.
FIG. 2 is a partial cross-sectional view of a tire constructed in accordance with this invention inflated and unloaded.

With reference to the drawings, and in particular FIGS. 1 through 4, there is shown a high-speed pneumatic tire 10. In each case the tire 10 includes a cord fabric carcass 11 and a tread portion 12 disposed about the carcass 11 and overlying the same. A pair of spaced bead portions 14 are located at the radially inner end of the tire and a pair of sidewall portions 13 extend from the bead portions 14 to the tread 12. Shoulder regions 15 are located at the laterally outer edges of the tread 12 and at the upper end of the sidewalls 13. While the carcass 11 illustrated has four bias ply reinforcing layers it may have two or more such layers and may include chafers, flippers, etc., in the bead area.

Figures 3, 4:
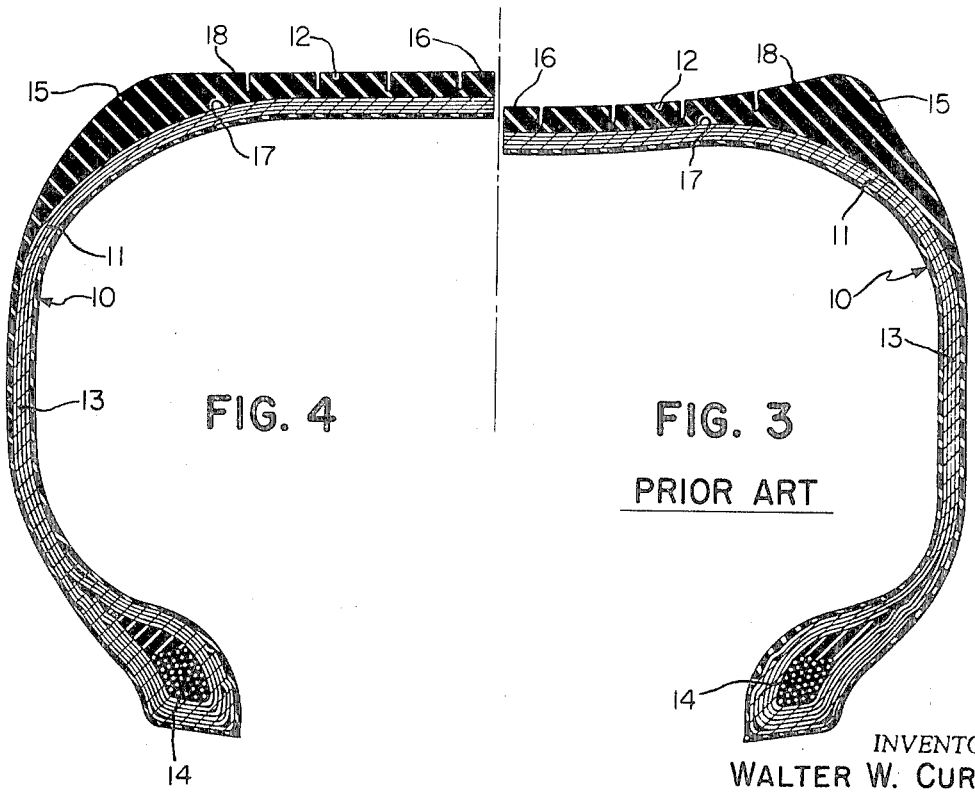
FIG. 3 is a partial cross-sectional view of the tire of FIG. 1 inflated and rotating at high speed.
FIG. 4 is a partial cross-sectional view of the tire of FIG. 2 inflated and rotating at a rate of speed similar to that of FIG. 3.

For purposes of illustration and comparison between a conventional tire shape and the shape of a tire constructed in accordance with this invention, the tires are illustrated in half of a cross-sectional view and each section of a tire according to this invention is placed opposite a section of a high-speed tire of conventional construction which is in the same state of motion. The tires in FIG. 1 and FIG. 2 are inflated to design inflation pressure, unloaded and in a static condition while the tires of FIGS. 3 and 4 are inflated to design inflation pressure unloaded and rotating at a high rate of speed. Each tire in FIGS. 1 through 4 is shown split along the midcircumferential centerplane. For purposes of this invention, the midcircumferential centerplane shall be a plane which is perpendicular to the rotational axis of the tire and passes through the tread area midway between the lateral edges thereof. The midcircumferential centerline is a circle which lies both in the midcircumferential centerplane and on the surface of the tread. For purposes of this invention, "cord angle" shall be defined as the acute angle between the cord and a line intersecting the cord at the point in question, said line being perpendicular to both the rotational axis of the tire and a line from the point in question to the rotational axis of the tire.

With reference to FIG. 1 a conventional high-speed tire when mounted on a rim and inflated has a generally flat contour across the tread area 12; however, as illustrated in FIG. 3 the same tire when rotated at a high rate of speed distorts irregularly in the tread area. The shoulder 15 has more mass that a central portion 16 of the tread and consequently is pulled radially outwardly of the rotational axis of the tire by centrifugal force leaving the tread in an arched configuration, as best seen in FIG. 3. Referring now to FIG. 2 a tire constructed in accordance with this invention has a generally flat tread portion when inflated and in a static condition. This same tire, as illustrated in FIG. 4, when inflated and rotating at a high rate of speed remains flat since the shoulder portions 15 and the rest of the tread expand substantially the same amount in the radial direction. This substantially flat tread profile is obtained throughout a wide range of speeds by this invention, as shown in FIGS. 2 and 4, where operating conditions vary respectively from static to a high rate of speed. This flat tread profile has an important influence on the stability and controllability of high-speed tires, such as racing tires and aircraft tires.

Figure 6:
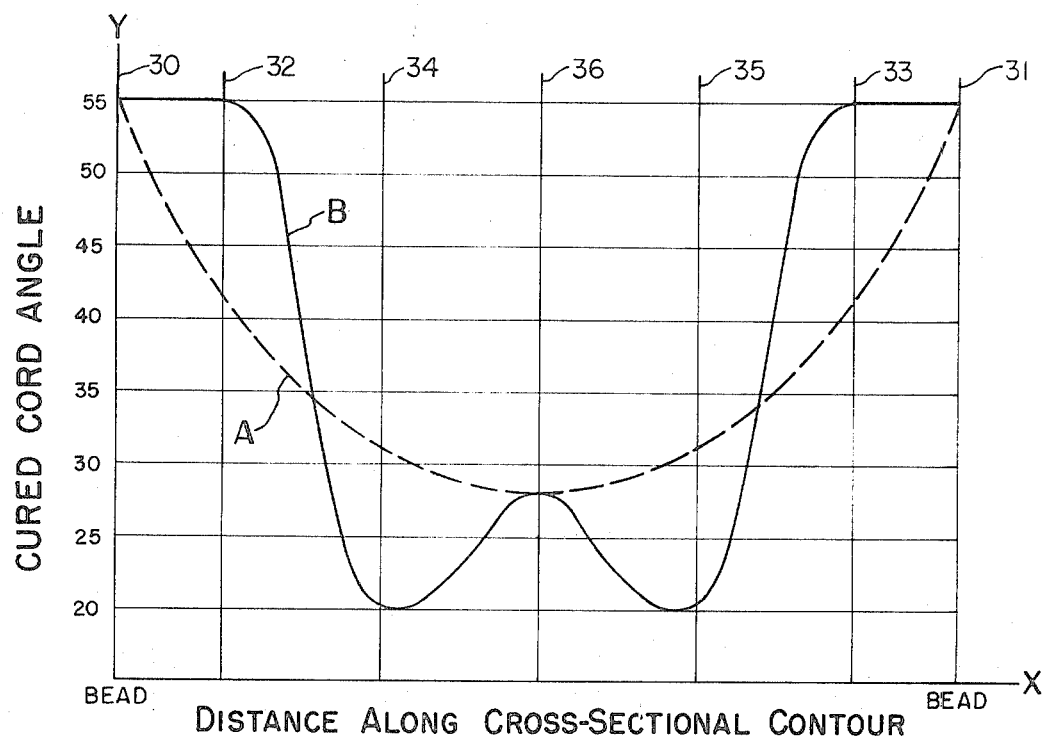
FIG. 6 is a graph showing the change in cured cord angle from bead to bead of both a prior art high-speed tire and a tire constructed in accordance with this invention.

It has been discovered that a stable dynamic tread profile such as that illustrated in FIGS. 2 and 4 can be achieved by utilizing a unique cord path configuration which is characterized by a low cord angle in the area of the midcircumferential centerline, an even lower cord angle in the shoulder regions, or the areas of thickest tread gage, and a relatively high cord angle at the bead portions. FIG. 6 is a graph illustrating the change in cord angle from bead to bead of a tire of conventional construction and a tire constructed in accordance with this invention. The cord angle is plotted on the Y axis and the distance along the cross-sectional contour of the tire is plotted along the X axis. The location of the bead portions 14 along the contour is represented by the vertical lines 30 and 31, the points of maximum section width by the vertical lines 32 and 33, the shoulder regions 15 by the lines 34 and 35 and the midcircumferential centerplane by the line 36. The point of maximum section width of the tire is that point on the sidewall at which the width of the tire, exclusive of external lettering or adornment, is greatest as measured parallel to the rotational axis of the tire and between the external surfaces. The chain dot line A in FIG. 6 illustrates the cord angle change from bead to bead of a conventional racing tire. As seen in the plot of line A, the cord angle of this conventional tire is approximately 55° in the area of the beads and progressively decreases to an angle of approximately 28° in the crown area or in the area of the midcircumferential centerplane. The solid line B on the same graph illustrates the cord angle change of a tire constructed in accordance with this invention. The angle of the cord in the area of the bead portions 14 is 55° and remains constant from the bead portions 14 to the point of maximum section width of the tire. The cord angle then decreases quite rapidly to a minimum of 20° in a pair of portions on laterally opposite sides of the midcircumferential centerplane where the tread mass is greater than it is at said centerplane. In the specific embodiment illustrated this pair of portions having a high mass is the pair of shoulders 15. The cord angle then increases again to approximately 28° in the area of the midcircumferential centerplane.

The low cord angle in the crown area, or the area of the midcircumferential centerline is utilized in most high-speed tires to obtain the low profile and prevent the center crown area from expending under centrifugal force when the tire is rotating at a high rate of speed. In the past this, along with reverse molding, has been adequate to maintain the tread area in a generally flat configuration. As mentioned before, however, the speeds have increased and aspect ratio has been reduced to the extent that the shoulder areas not tend to expand radially under centrifugal force. To overcome this expansion of the shoulder areas at high speed, the cord angle in the shoulder areas is decreased to an angle which is even lower than the cord angle in the area of the crown. This low cord angle in the shoulder area provides increased circumferential stiffness which restricts the outer diameter of the tire and prevents the radial throwout under centrifugal force without the use of belts in this region. The constant high angle portion of the carcass from the point of maximum section width to the bead area provides more flexibility in the sidewalls and ultimately a softer, smoother ride.

Figure 5:
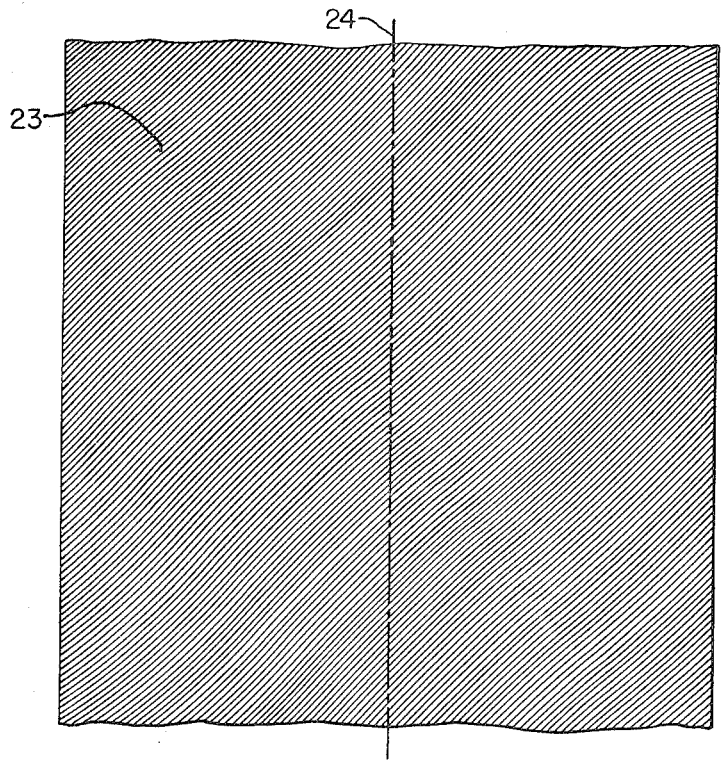
FIG. 5 is a plan view of an uncured fabric ply in the flat condition used in constructing a tire in accordance with this invention.

In order to obtain this special cord path configuration in the cured tire carcass, special cord path fabric plies are used in the initial construction of the tire. With reference to FIG. 5 there is illustrated a portion of special uncured flat fabric ply 23 made in accordance with this invention. The cords in fabric extend at an angle of 47° to the centerline 24 of the fabric at the centerline 24. This angle, however, decreases as the cords extend farther from the centerline and then begins to increase to a maximum angle at the lateral edges of the fabric. The fabric 23 in FIG. 5 when used to build a tire carcass on a conventional tire-building drum which is then shaped to the toroidal form and cured in a mold will produce a tire having the cord angle configuration illustrated by curve B of FIG. 6.

This invention is particularly adapted to high-speed low-profile tires. Such tires normally have a cord angle in the area of the midcircumferential centerplane of at least 20° but less than 35°. The precise cord angle at the midcircumferential centerline should be determined by the tire design engineer and will be dependent upon the desired tire characteristics. For example, if increased circumferential stiffness and good high-speed qualities are desired the centerline cord angle will be low. However, if less circumferential stiffness and softer ride are desired the centerline cord angle should be increased. The cord angle at the bead portions 14 should be between 40° and 80° and preferably between 50° and 65°. Again, the precise cord angle at the bead portions is a matter of choice to be determined by the tire design engineer and will depend on the desired tire properties such as lateral and radial spring rate. It is preferred that the cord angle in the sidewalls between the beads and point of maximum section width be substantially the same as the cord angle at the beads 14. It has been discovered that to obtain sufficient circumferential stiffness or belting effect in the shoulder regions the angle of the cords in the shoulder regions should be at least 4° and preferably between 6° and 12° less than the angle of the cords in the crown area.

The procedure by which the preferred cord angle differential is determined for the shoulder region is based on the centrifugal force developed at the centerline of the tire as opposed to the shoulder for the given speed of operation. The centrifugal force can be accurately calculated for any speed, but at a given speed, is a function of mass concentration of the tread rubber at the centerline and at the shoulder region. In high-speed-type tires, such as racing and aircraft tires, the ratio of shoulder tread gage to centerline tread gage generally falls within the range of 1.4 to 2.25. As illustrated in FIG. 1, the tread gage T is equal to the thickness of the tread as measured from the radially outermost side 17 of the radially outermost carcass ply to the surface 18 of the tread or nonskid. The tread gage T at any particular point is the shortest distance from the side 17 of the radially outermost carcass ply to the surface 18 of the tread.

It has been discovered that if a high-speed tire has the low tread gage ratio of 1.4, a cord angle which is about 6° less in the shoulder area than the cord angle in the area of the midcircumferential centerline will provide the intended flat dynamic profile. For purposes of this invention, the tread gage ratio (TGR) will mean the ratio of the tread gage at the thickest point on laterally opposite sides of the midcircumferential centerline to the tread gage at said centerline. In most instances the maximum tread gage will be located in the shoulder areas. A tire with the high tread gage ratio of 2.25 will have the intended flat dynamic profile if the cord angle in the shoulder area is about 12° less than the cord angle in the area of the midcircumferential centerplane. The mass effect on centrifugal force is linear and the effective stiffness produced by the lower angle is also linear. The cord angle differentials for tread gage ratios between 1.4 and 2.25 will therefore fall proportionately between 6° and 12°. Expressed mathematically, the minimum cord angle in the shoulder area is less than the cord angle at the midcircumferential centerline by an amount equal approximately to 6° plus [12−6/2.25−1.4] [TGR−1.4] or [6+7 (TGR−1.4)] when TGR equals the tread gage ratio between the shoulder or portion having maximum tread gage and the midcircumferential centerplane. The differential in angle between carcass centerplane and shoulder is, therefore, based on the tread gage ratio of these two areas.

Once having decided the desired cured cord configuration, as described above, the flat ply fabric cord configuration is then determined. This cord path configuration may be determined for the desired mold shape by use of the well-known cosine law of pantographing which expressed mathematically is $$\gamma \cos \alpha = \rho \cos \beta \text{ when:}$$

$\alpha$ is the cured cord angle at the point in question.

$\rho$ is the radius from the rotational axis of the tire to the point at which $\alpha$ is measured.

$\beta$ is the angle of the cords at the point in question when the ply is in the flat condition.

$\gamma$ is the radius of the tire-building drum.

Plies having the cord configuration as determined by the cosine law are then constructed by any convenient means. These plies, and the other tire components such as beads and tread rubber, are then assembled on a conventional tire-building drum. The tire is shaped to the toroidal form and cured in a conventional manner.

It should be noted that, while in the specific embodiment illustrated the minimum cord angle appears in the shoulder area, the invention is not intended to be limited to the minimum cord angle being in the shoulder area only but may include a minimum cord angle in any pair of high mass portions of the tread on laterally opposite sides of the midcircumferential centerplane having a thick tread gage as compared to the centerline tread gage such as immediately adjacent the shoulders.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a cord-reinforced carcass having a pair of sidewall portions and a tread extending about and overlying the carcass, said tread having a mass which is greater at a pair of portions spaced apart on opposite sides of the midcircumferential centerplane of the tire than at said centerplane, the carcass having a cord angle in the portions thereof underlying the tread portions of greatest mass which is at least 4° less than the cord angle at said midcircumferential centerplane, the maximum cord angle of said carcass being in the sidewall portions of the carcass and the cord angle in the carcass at the midcircumferential centerplane being less than 35°

2. A tire as claimed in claim 1 wherein the cord angle in the carcass at said pair of portions is less than the cord angle at said centerplane by an amount equal approximately to [6+7 (TGR−1.4b] ° when TGR is equal to the tread gage ratio between said pair of portions and said centerplane.

3. A tire as claimed in claim 1 wherein said sidewall portions each include a pair of bead portions, the cord angle of said carcass being substantially constant from said bead portion to the point of maximum section width.

4. A tire as claimed in claim 3 wherein the cord angle in the carcass at said pair of portions is less than the cord angle at said centerplane by an amount equal approximately to [6+7 (TGR−1.4b)]° when TGR is equal to the tread gage ratio between said pair of portions and said centerplane.

5. A tire as claimed in claim 1 wherein the cord angle in the carcass at said midcircumferential centerplane is between 20° and 35°, the maximum cord angle in the sidewall is between 40° and 80° and the cord angle in said pair of portions is between 6° and 12° less than the cord angle at said midcircumferential centerplane.

6. A tire as claimed in claim 5 wherein said sidewall portions each include a pair of bead portions, the cord angle of said carcass being substantially constant from said bead portion to the point of maximum section width.

7. A tire as claimed in claim 6 wherein the cord angle in the carcass at said pair of portions is less than the cord angle at said centerplane by an amount equal approximately to [6+7 (TGR−1.4)]° when TGR is equal to the tread gage ratio between said pair of portions and said centerplane.

* * * * *

UNITED STATES PATENT OFFICE
CERTIFICATE OF CORRECTION

Patent No. 3,628,586          Dated December 21, 1971

Inventor(s) Walter W Curtiss

It is certified that error appears in the above-identified patent and that said Letters Patent are hereby corrected as shown below:

On the first page of the printed patent immediately following the last line of the Abstract of the Disclosure, insert the following paragraph.

The foregoing abstract is not to be taken as limiting the invention of this application, and in order to understand the full nature and extent of the technical disclosure of this application, reference must be made to the accompanying drawings and the following detailed description.

Column 4, Claim 2, line 4, $(TGR - 1.4b]^\circ$ should be $(TGR -1.4)]^\circ$

Column 5, Claim 4, line 4, $(TGR - 1.4b]^\circ$ should be $(TGR -1.4)]^\circ$

Signed and sealed this 25th day of July 1972.

(SEAL)
Attest:

EDWARD M. FLETCHER, JR.      ROBERT GOTTSCHALK
Attesting Officer                 Commissioner of Patents